United States Patent [19]
Steeves

[11] Patent Number: 6,034,603
[45] Date of Patent: Mar. 7, 2000

[54] RADIO TAG SYSTEM AND METHOD WITH IMPROVED TAG INTERFERENCE AVOIDANCE

[75] Inventor: Wayne E. Steeves, Reston, Va.

[73] Assignee: Axcess, Inc., Carrollton, Tex.

[21] Appl. No.: 08/789,148

[22] Filed: Jan. 24, 1997

[51] Int. Cl.[7] .................................................. G08B 13/14
[52] U.S. Cl. ................ 340/572.1; 340/928; 340/825.44; 340/825.54; 455/31.3; 370/445; 370/448; 235/384
[58] Field of Search ................................. 340/572, 568, 340/571, 505, 928, 502, 825.54, 825.34, 825.35; 342/42, 51, 40, 44, 50; 370/448, 310, 347, 445, 825.44; 455/31.3; 235/384

[56] References Cited

U.S. PATENT DOCUMENTS

| | | | |
|---|---|---|---|
| 4,303,910 | 12/1981 | McCann | 340/572 |
| 4,471,345 | 9/1984 | Barrett, Jr. | 340/572 |
| 4,528,663 | 7/1985 | Citta | 340/825.54 |
| 4,691,202 | 9/1987 | Denne et al. | 340/825.54 |
| 4,862,160 | 8/1989 | Ekchian et al. | 340/825.54 |
| 4,955,038 | 9/1990 | Lee et al. | 455/343 |
| 5,153,878 | 10/1992 | Krebs | 370/347 |
| 5,175,729 | 12/1992 | Borras et al. | 370/79 |
| 5,220,557 | 6/1993 | Kelley | 370/50 |
| 5,227,803 | 7/1993 | O'Connor et al. | 342/442 |
| 5,266,925 | 11/1993 | Vercellotti et al. | 340/572 |
| 5,272,476 | 12/1993 | McArthur et al. | 340/825.54 |
| 5,305,008 | 4/1994 | Turner et al. | 342/44 |
| 5,351,052 | 9/1994 | D'Hont et al. | 342/42 |
| 5,371,899 | 12/1994 | Kuznicki et al. | 455/34.1 |
| 5,425,032 | 6/1995 | Shloss et al. | 340/825.54 |
| 5,448,242 | 9/1995 | Sharpe et al. | 342/42 |
| 5,450,087 | 9/1995 | Hurta et al. | 342/42 |
| 5,453,747 | 9/1995 | D'Hont et al. | 342/42 |
| 5,471,212 | 11/1995 | Sharpe et al. | 342/51 |
| 5,488,376 | 1/1996 | Hurta et al. | 342/42 |
| 5,525,992 | 6/1996 | Froschermeier | 342/42 |
| 5,525,994 | 6/1996 | Hurta et al. | 342/51 |
| 5,539,394 | 7/1996 | Cato et al. | 340/825.54 |
| 5,621,412 | 4/1997 | Sharpe et al. | 342/51 |
| 5,640,151 | 6/1997 | Reis et al. | 340/825.54 |
| 5,668,803 | 9/1997 | Tymes et al. | 340/825.54 |
| 5,686,902 | 11/1997 | Reis et al. | 340/825.54 |
| 5,721,733 | 2/1998 | Wang et al. | 370/448 |
| 5,737,330 | 4/1998 | Fulthorp et al. | 370/448 |
| 5,745,037 | 4/1998 | Guthrie et al. | 340/573 |
| 5,754,541 | 5/1998 | Glisic et al. | 370/335 |

FOREIGN PATENT DOCUMENTS

| | | | |
|---|---|---|---|
| 0 161 779 A1 | 11/1985 | European Pat. Off. | G01S 13/78 |
| 0 245 555 A1 | 11/1987 | European Pat. Off. | G01S 13/74 |
| 0 467 036 A2 | 1/1992 | European Pat. Off. | G01S 13/74 |
| 0 565 046 A2 | 10/1993 | European Pat. Off. | H04B 7/26 |
| WO 91/17515 | 11/1991 | WIPO | G06K 7/10 |
| WO 93/04537 | 3/1993 | WIPO | H04B 1/38 |

OTHER PUBLICATIONS

"Radio Frequency Identification (RFID)—Standards, Common Applications, A Look Ahead, and Recommended Reading," http://www.aimglobal.org/techinfo/rfid/rfidintro.html, 4 pp., Jun. 7, 1999.

AIM International, Inc., "Radio Frequency Identification RFID—A Glossary: AIM International WP–98/001R," http://www.aimglobal.org/techinfo/rfid/aimrfidglossary.html, Jun. 7, 1999.

AIM International, Inc., "Radio Frequency Identification RFID—A Basic Primer: AIM International WP–98/002R," http://www.aimglobal.org/techinfo/rfid/aimrfidbasics.html, Jun. 7, 1999.

*Primary Examiner*—Nina Tong
*Attorney, Agent, or Firm*—Baker & Botts, L.L.P.

[57] ABSTRACT

A data transmission system includes a reader transceiver and one or more tag transceivers. The reader transmits an activation signal to a tag. The tag selectively transmits a response signal to the reader at a specific time determined by a detected level of communications channel activity. The detector operates in a low-power standby state until the time it receives the activation signal, and then operates in an active state. The invention further incorporates a technique to maintain an extremely low power state to the tag during quiescent mode while retaining full sensitivity to reader activation signals. The reader transceivers are of a modular architecture with each module operating independently, yet in concert with the others. The modules are interconnected in a media independent method and can interact remotely with other modules.

28 Claims, 3 Drawing Sheets

RADIO TAG SYSTEM AND METHOD WITH IMPROVED TAG INTERFERENCE AVOIDANCE

BACKGROUND AND FIELD OF THE INVENTION

This invention relates generally to radio frequency identification (RFID) systems and methods, and specifically to systems and methods for two way communication among radio tags and readers using techniques that reduce interference among a number of radio tags.

The management and tracking of personnel, assets, and other objects is required in a wide variety of environments, and is often cumbersome, labor intensive, and expensive. Radio receivers and transmitters have been used for many years to identify personnel and objects in such environments. For example, many systems are known for attaching radio tags to items, such as automobiles, so that when automobiles equipped with radio tags enter a certain area, such as a toll booth area, the automobiles are automatically identified and the appropriate tolls are deducted from corresponding accounts, thereby obviating the need for drivers to stop and make payment at toll booths. Innumerable other applications for such radio tag systems have been identified, in areas ranging from inventory control to facility security to sporting event timing.

Using the vehicle identification example mentioned above, known systems typically provide an RFID "reader" for each lane of traffic. In one type of known system, such readers intentionally have a small effective coverage area to prevent signals from multiple vehicles from interfering with one another. Otherwise, multiple tags transmitting simultaneously from two or more vehicles might cause signal interference with one another, thereby impeding the reception of valid data at a reader.

Although a number of "multiple-read" systems are known for reducing the deleterious effects of collisions among multiple tag signals, none is sufficiently robust to effectively provide a multiple-read system that uses a single reader to cover an area where a large number of radio tag-equipped vehicles are entering at the same time.

It would therefore be desirable to have systems and methods that could more effectively provide the capability for reading data from multiple radio tags at essentially the same time.

SUMMARY OF THE INVENTION

In accordance with the present invention, a data transmission system (100) includes a reader transceiver (101) and one or more tag transceivers (151). The reader transmits an activation signal to the tag. The tag selectively transmits a response signal to the reader at a specific time determined by a detected level of communications channel activity.

Also in accordance with the present invention, the specific time for transmitting the response signal is determined by the tag according to a randomized time slot selection seeded by a pre-transmission listening period to determine the amount of RF traffic.

Further in accordance with the present invention, the reader transmits a request signal and the tag selectively transmits a response signal based on predetermined characteristics of the request signal.

Still further in accordance with the present invention, the tag operates in a low-power standby state until reception of the activation signal causes the tag to operate in an active state.

In another aspect of the invention, a method of transmitting data includes transmitting, by a reader transceiver, an activation signal to a radio tag; and transmitting, by the radio tag, a response signal to the reader at a specified time, the specified time being determined responsive to an activity level of a communications channel.

Further aspects of the invention utilize a two way communications protocol which includes tag acknowledgment to take advantage of stopping near field tags from transmitting repetitively so that far field tags can transmit in accordance with the invention without interference from the stronger signal of the near field tags.

In another aspect of the invention, to maintain a long tag life and low tag cost a simple modified superregenerative circuit is utilized wherein the quench frequency is varied to control current draw and tag sensitivity to activation signals.

The features and advantages described in the specification are not all inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DESCRIPTION OF A PREFERRED EMBODIMENT

The figures depict a preferred embodiment of the present invention for purposes of illustration only. One skilled in the art will readily recognize from the following discussion that alternative embodiments of the structures and methods illustrated herein may be employed without departing from the principles of the invention described herein.

Figure 1:
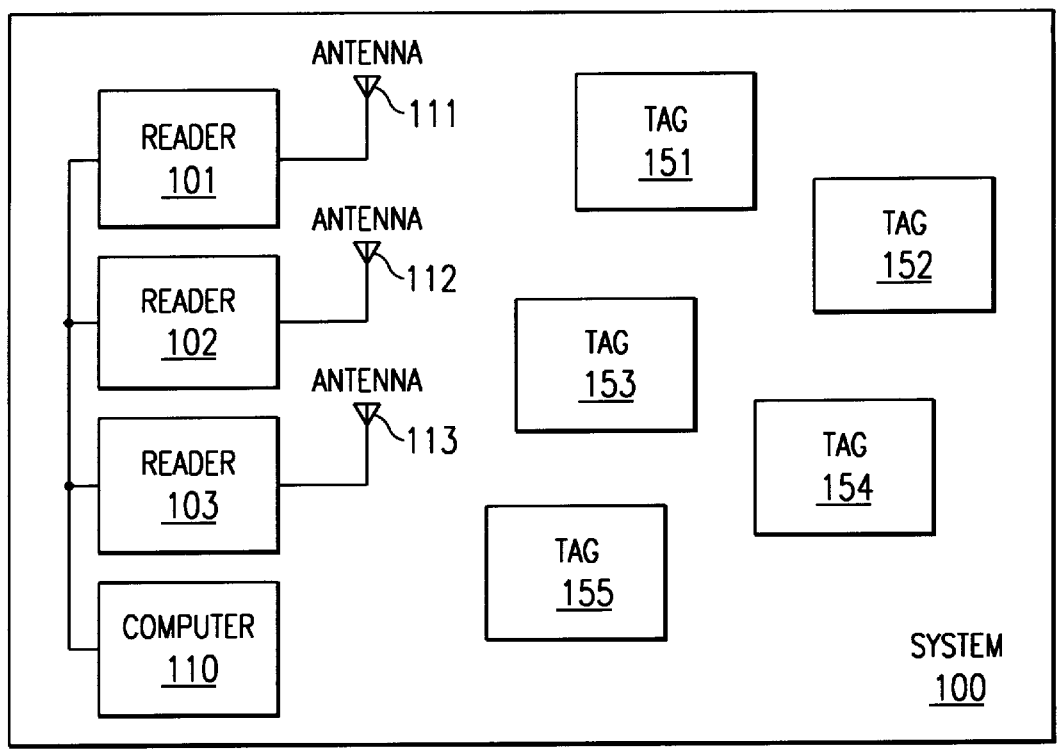
FIG. 1 is a block diagram of a system for data transmission, in accordance with the present invention.

Referring now to FIG. 1, there is shown a system 100 in accordance with the present invention. The operation of the system 100 is illustrated by discussion of the component parts illustrated in FIG. 1. In the embodiment of system 100 illustrated in FIG. 1, three readers 101–103, each with respective antennas 111–113, communicate with radio tags 151–155. As described in greater detail below, computer 110 connected to readers 101–103 directs the transmission of signals from readers 101–103 to tags 151–155 and processes data received by readers 101–103. Readers 101–103 communicate with computer 110 via a media independent control network such as LonWorks® (a registered trademark of Echelon, Inc.). Computer 110 contains applications level software that commands the readers to interrogate in accordance with the desired application of the present invention. Each reader 101–103 is individually addressed by computer 110 using industry standard control network protocols or, in the case of an RF interconnection scheme, the collision avoidance techniques of the present invention are utilized.

In a preferred embodiment, computer 110 is connected to readers 101–103 using conventional industry standard physical connections, e.g., under the industry standard EIA232 or EIA485 protocols. The application software running on computer 110 communicates via the physical connections using conventional ASCII command syntax. For example, in a preferred embodiment commands issued by computer 110 to readers 101–103 take therefrom of a packet in C language syntax, such as:

```
struct Tag
Command {
    char ReaderID;   \\Reader ID# or Reader Group ID to respond
    char TagID;      \\Tag ID or grouping to search for
    char TagInfo;    \\Portion of tag data to interrogate
    char Command;    \\Command: i.e. Program tags, Locate tag, Follow tag
}
```

Other formats, e.g., a single line non-structured command syntax, could also be employed in other embodiments, as needed for any particular application.

It should be readily apparent that the embodiment illustrated in FIG. 1 is merely exemplary of a system in accordance with the present invention, and that other embodiments using, for instance, different numbers of readers and tags, could be employed as needed in any particular application.

In systems including numerous tags and readers, some provision must be made for the possibility that more than one tag may, at any particular time, seek to transmit an identification signal. So-called "single-read" RFID systems force the readers, or the tags, or both, to be spaced in a manner that only one tag is within range of any particular reader at any given time. Known "multiple-read" systems seek to ameliorate interference through randomized time delay of data tag signal transmissions after an inquiry signal sent by a reader or through repetitive transmission of data tag signals. An unfortunate result of such techniques is that significant signal bandwidth is wasted, either by being unused during such randomized waiting periods or by repetitive transmission of the same data.

In contrast, system 100 uses improved techniques for avoiding collisions among tag signals, for detecting such collisions, and for reconstructing data packets affected by such collisions. In the operation of system 100 a tag, e.g., 151, remains in a low-power quiescent stand-by state until activated by a signal from a reader, e.g., 101. Following transmission of the activation signal, the reader sends a request for information, in essence polling any activated tags within range. A receiving tag determines whether the requested information is relevant to that tag. If not, the tag returns to its quiescent stand-by state. If the request is relevant, the tag transmits the requested information to the reader as detailed herein.

Figure 2:
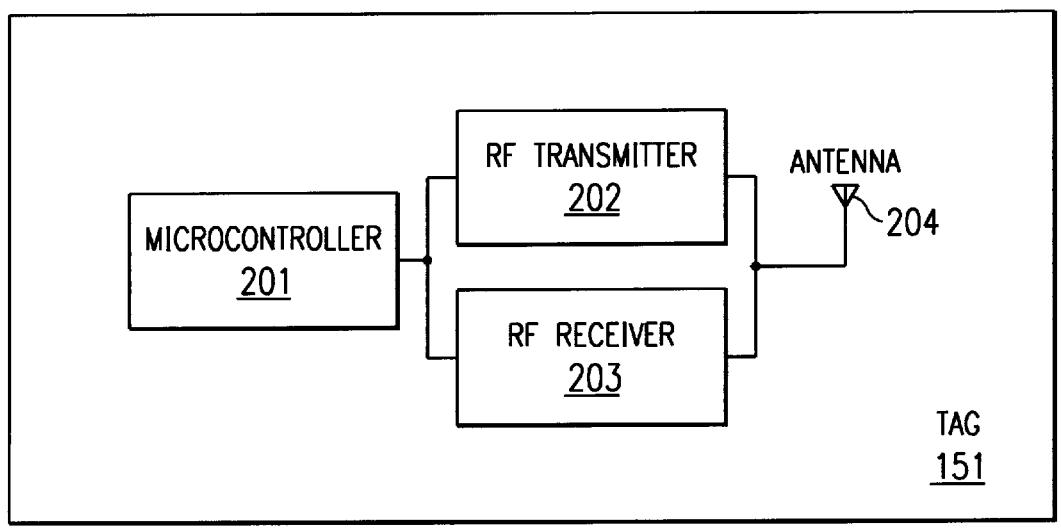
FIG. 2 is a block diagram of a radio tag, in accordance with the present invention.

Referring now also to FIG. 2, a tag, e.g., 151, includes a microcontroller 201, an RF transmitter 202, an RF receiver 203, and an antenna 204. In a preferred embodiment, microcontroller 201 is implemented using a conventional model MC143120 microcontroller chip available from Motorola, Inc. (in alternative embodiments other microcontrollers, such as a model COP842 microcontroller chip from National Semiconductor, Inc., may be used), RF transmitter 202 is implemented using a conventional transmitter circuit such as model NT315TX available from Advanced Systems Group International; and antenna 204 is implemented using a conventional antenna with conventional switching circuitry allowing use of antenna 204 with both transmitter 202 and receiver 203. It should be recognized that other components could be used in alternate embodiments. RF receiver 203 is, in a preferred embodiment, implemented by a modified super-regenerative receiver circuit whereby the quench frequency is varied to provide quiescent operation with a current draw in a quiescent stand-by state of less than 2 microamps, further described below.

Figure 4:
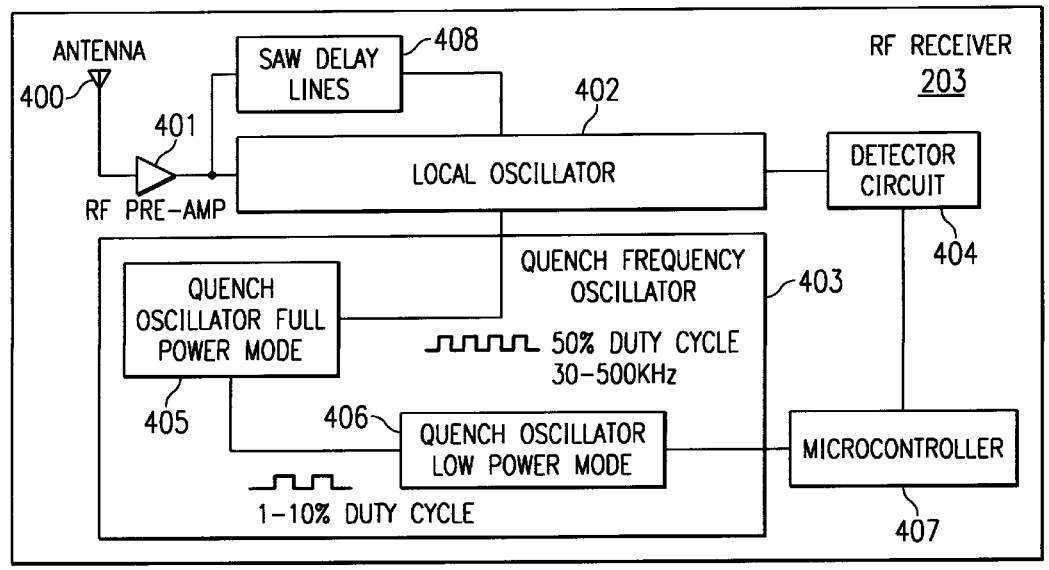
FIG. 4 is a block diagram of a superregenerative micropower receiver circuit in accordance with the present invention.

Referring now to FIG. 4, power control functions of superregenerative receiver, e.g., 203 permit some of the elements of receiver 203 to be completely shut down to save tag power while operating in a quiescent state. Conventional superregenerative receiver designs include a front end amplification stage, a local oscillator operating at the center frequency, a quench frequency oscillator operating with a duty cycle of at least 10 times the data rate, and a detector circuit. The modified design of the present invention includes the amplification stage 401, the local oscillator 402, and quench frequency source 403, and a detector stage 404 as in conventional designs. Conventional designs utilize typical forward-biased transistor stages configured as amplifiers. The present invention utilizes the same method of amplification except that forward biasing is provided by the quench frequency such that power draw is limited to 50% of the normal 100% biasing techniques due to the 50% duty cycle of the quench. Amplifier power 401, is limited to leakage currents only (generally less than 500 nanoamps) when the quench frequency is shut down.

Additionally, the local oscillator (LO) in conventional designs is controlled by the quench frequency such that it is turned off prior to achieving stable oscillation. In this way the RF is sampled as the LO is able to achieve stable oscillation significantly faster in the presence of an RF signal than without an RF signal. The detector circuit simply filters out the quench and LO frequencies (low pass filters) leaving the pulse created by the increased size of the RF envelope with RF present.

Since the LO 402 is also turned on and off by the quench frequency, power can also be controlled in the same way as the front end amplifier 401 biasing described above. A Surface Acoustic Wave (SAW) Delay Line 408 (in a preferred embodiment model no. SL1011 from RF Monolithics, and in alternate embodiments any of the SLXXXX series of devices or equivalents) provides stability to the LO frequency and inserts the proper timing for signal reception 400, amplification 401 and quench 403 sampling of the LO 402.

Figure 5:
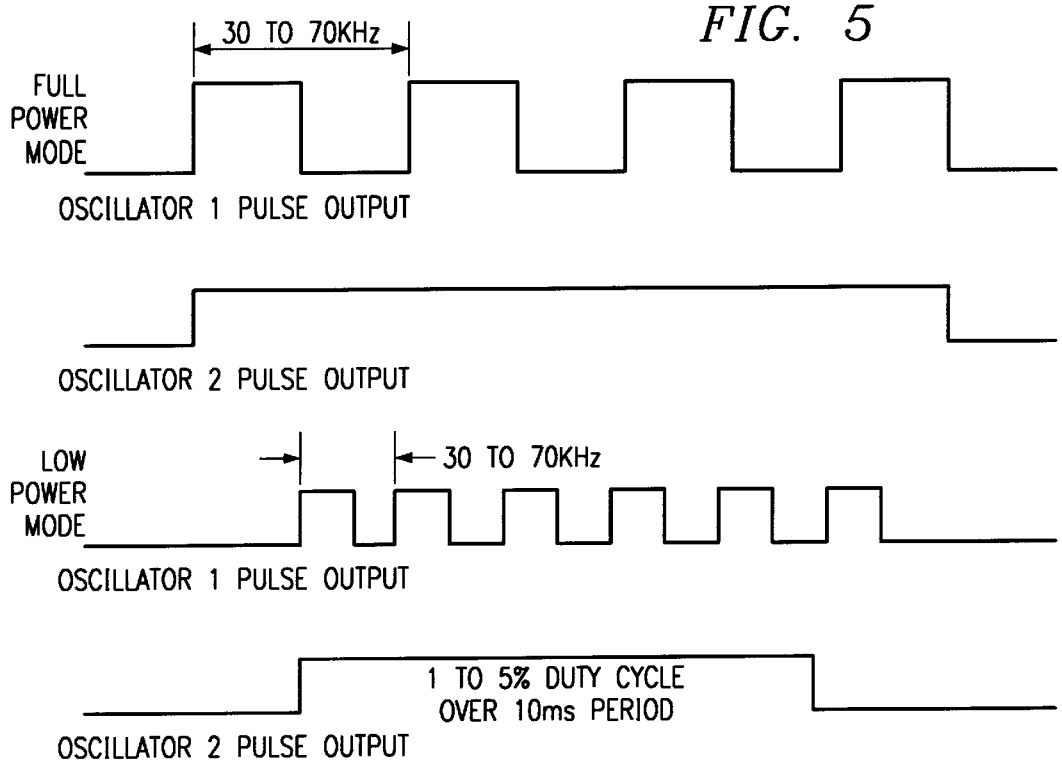
FIG. 5 is a diagram of superregenerative receiver quench frequency oscillator outputs in accordance with the present invention.

In the configuration illustrated in FIG. 4, the quench frequency oscillator 403 actually consists of two separate oscillators that operate in one of two modes and that are referred to as quench oscillator full power mode 405 and quench oscillator low power mode 406. In low power quiescent mode, the oscillator 403 outputs a quench signal as in FIG. 5. A duty cycle of 1 to 5% over a period of 10 ms provides sufficient time for reception of a 20 to 30 ms activation signal and reduces total circuit draw by as much as 99%. The high pulse consists of a 30 to 500 khz 50% duty cycle trapezoidal pulse train for normal quenching of the LO 402. When a signal is detected microcontroller 407 turns off the low duty cycle oscillator 406 such that the 50% 30 to 500 khz normal quench frequency is maintained for normal data retrieval.

Referring again to FIG. 4, the detector circuit 404 is a micropower diode/comparator arrangement although other more efficient types of detectors can be implemented in alternate embodiments as long as the power requirement is 1 microamp or less to minimize the total circuit power requirement. The detector circuit 404 illustrated in FIG. 4 is typical of superregenerative and other receiver designs, with low power consumption being achieved through use of conventional low power componentry, e.g., in a preferred embodiment a model MAX417 dual op-amp device from Maxim (not shown). In a preferred embodiment, detector circuit 404 operates as follows: The output of quench frequency oscillator 403 as integrated with the local oscillator 402 is first passed through a low pass filter (not shown) and applied to the first op amp of the Maxim device to amplify the resulting signal sufficiently to be applied to the second op amp of the Maxim device, which is configured as a comparator creating a data pulse from detector circuit 404 when triggered. This data pulse is then applied to microcontroller 407 to indicate that Quench Frequency Oscillator 403 should be placed in full power mode 405 by setting Quench Oscillator Low Power Mode 406 to a stable high output state.

Referring again to FIG. 2, in a preferred embodiment, frequency modulation using conventional frequency-shift keying is employed for data transmission, as such transmission is found to provide good selectivity and noise immunity. Microcontroller 201 is conventionally programmed to provide the logic for the functionality described herein, and is coupled to receiver 203 to provide receiver sensitivity and power control via the quench oscillator 403.

Figure 3:
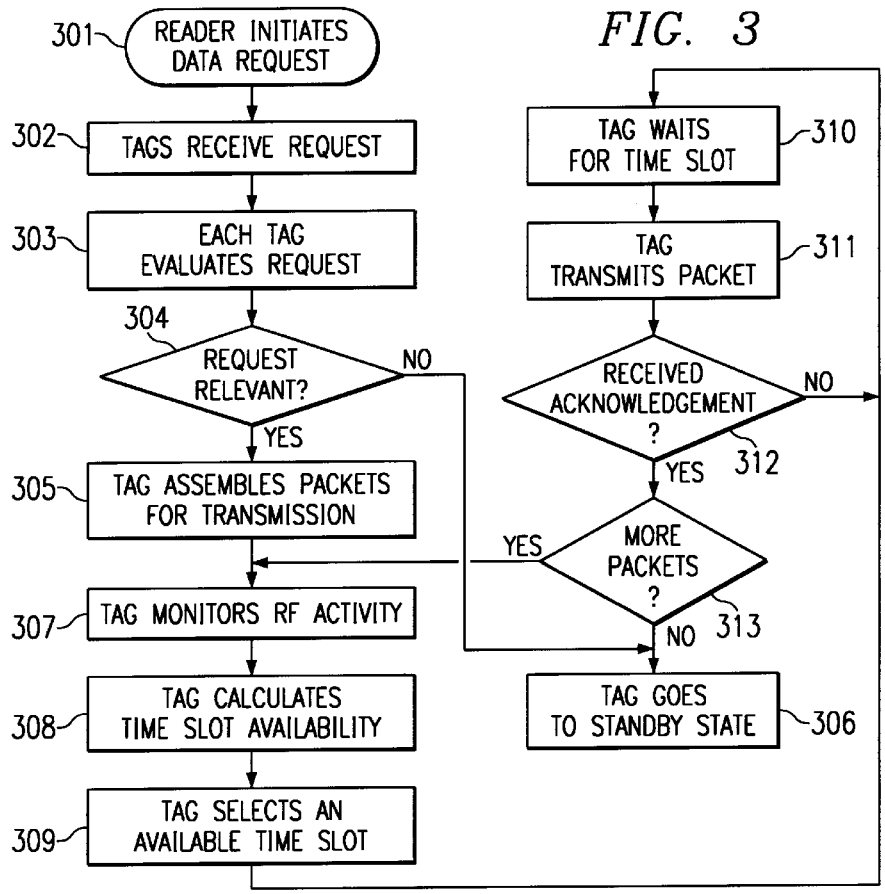
FIG. 3 is a flow chart illustrating processing, in accordance with the present invention.

Referring now also to FIG. 3, there is shown a flow diagram illustrating the logic used for implementation of processing for tag 151. Tag 151 is normally in a low-power quiescent stand-by state in which tag 151 monitors the RF environment for an activation signal from a reader, e.g., 101. A reader initiates 301 a request for tag data by transmitting such an activation signal, followed by a request for data. The activation signal is received 302 by all tags within range of the transmitting reader, and causes each such tag to change from quiescent stand-by state to an active state. Once in active state, the tags evaluate 303 the request sent by the reader.

In a preferred embodiment, the activation signal is a modulated waveform with a preamble and a unique reader ID number. Modulation is pulse width using conventional continuous wave (CW), i.e., unmodulated, signal at the center frequency to which the RF receiver 203 is tuned.

In a preferred embodiment, a reader transmits a request that is directed to a single tag, to a subset of tags, or to any tag within range as directed by computer 110. Based on the nature of the request, each active tag makes a determination 304 as to whether the request is relevant to that tag. If not, the tag returns 306 to quiescent stand-by state.

If the request is relevant, the tag assembles 305 a packet of data, including a tag identification number and, depending on the nature of the request from the reader, other relevant information. For example, in one application the request may be for all tags corresponding to fresh food crates to identify themselves and to transmit their preprogrammed expiration dates. If the requested data are voluminous, in a preferred embodiment the data are formed into several packets for individual transmission. In practice it is found that fewer collisions occur by transmitting several smaller packets than one large packet.

Once the tag has assembled one or more packets of data, the tag receiver, e.g., 203, monitors 307 the RF traffic on the transmission channel to determine whether many other tags are responding. Based on the amount of other traffic, or noise, in the RF environment, the tag calculates 308 time slot availability for transmission of its data. In a preferred environment, the time slot availability includes a random component and is determined based upon packet size and the level of RF traffic being generated by other tags. The preprogrammed data rate and the amount of RF traffic determines the time the tag will spend determining slot availability.

The duration of a time slot is determined by dividing the tag data packet size by the fixed data rate of the tag. In a preferred embodiment, a data rate of 20k bits per second is employed with a packet size of 200 bits, making the time slots (i.e., cycle duration) equal to 200/20000, or 10 ms.

In a preferred embodiment, the maximum packet size for each tag is 200 bits and is pre-programmed at the time of manufacture. Packet size for a particular transmission is determined by the data being requested by the interrogation command sent by the reader, e.g., 101. Each tag is programmed to transmit during a fixed number of active cycles (two in a preferred embodiment), followed by a fixed number of passive cycles during which the tag does not transmit (ten in a preferred embodiment). In a preferred embodiment, the tag redundantly transmits the exact same packet during each of the two active cycles. Furthermore, before each of the two active cycles the tag is silent for a randomized number of passive cycles. In a preferred embodiment, the random number is less than or equal to the fixed number of passive cycles. Each reader transmits back acknowledgments using this same scheme.

As an example, one complete transmission from a tag would include a first random passive portion of, say, 7 cycles; a first fixed active portion of one cycle; a second random passive portion of, say, 4 cycles; a second fixed active portion of one cycle; and a final fixed passive portion of 10 cycles.

A tag that is preparing to transmit will listen for a pattern of two active cycles from another transmitting tag (the transmitting tag being uniquely identified by the ID number it transmits on each active cycle), and will synchronize with such transmitting tag based on the second active cycle transmission (after which that tag is certain to be silent for ten cycles). The tag attempting to commence transmission listens for RF activity from other tags during the final fixed passive 10-cycle period of the tag to which it has synchronized and, based on the amount of detected RF activity, determines whether to (i) transmit its signal during the next fixed passive 10-cycle period which it detects, or (ii) wait for a longer period of time to allow the RF environment to quiet down. In practice, it is found that the likelihood of simultaneous transmissions from multiple tags is significantly reduced by this technique.

By synchronizing on the non-random passive cycles of a transmitting tag, each tag attempting transmission can then determine how many of the ten passive cycles, i.e., available time slots, are being used by other tags. For instance, if the tag detects RF activity during eight of the ten passive cycles, that indicates a very crowded RF environment. In such event, the tag may determine not to initiate transmission, since it is highly probable that such transmission would take place at the same time as transmission from another tag and might therefore not be properly received by a reader, e.g., 101. In that case, the tag will continue to identify a series of two active cycles from some transmitting tag and determine the relative RF activity during the following 10 passive cycles until the amount of activity has reached some threshold value where transmission by the listening tag would have a sufficient possibility of successful transmission. In a preferred embodiment, this threshold is based on no RF activity being detected for at least five of the ten passive cycles. Also in a preferred embodiment, the threshold is based not on a single 10-cycle period but on a rolling average of several such periods.

Once a sufficiently quiet RF environment is detected, the tag wishing to transmit begins transmission of its message during one of the cycles of an ensuing ten passive cycle period, choosing at random one of the particular ten cycles for commencement of transmission. As previously described, the tag then waits a random number of passive cycles (in the preferred embodiment between one and ten) before its second active cycle, and then is silent for a fixed duration of ten more cycles.

Thus, with reference again to FIG. 3, based on the observed passive/active RF environment, the tag randomly selects 309 time slots for transmission and waits 310 for that selected time slot. At the allotted time, the tag transmits 311 a packet of data (using the two active cycles described above) and checks 312 for an acknowledgment signal from the reader indicating that the data packet was received. If so, a check 312 is made to see whether there are additional packets to transmit, in which case processing returns to 307 to enable such transmission as described above. If the acknowledgment signal is not received, processing returns to 310 so that the current packet may be retransmitted at the next available time slot. After all of the packets have been successfully transmitted, processing returns to 306 and the tag is put back in the quiescent low-power standby state.

In a preferred embodiment, system 100 can tolerate slight overlaps of transmissions causing interference at the beginning or end of a data packet transmission. A number of hashing bits are installed at the beginning and end of each packet to verify data is received accurately and to possibly allow in some embodiments for data reconstruction in the event an overlap occurs. The first and last bits generally have a 2 to 5 times greater pulse width than a normal bit and transmission overlap will then usually only impact the first several bits. The hashing bits allow the reader unit to substitute bits until the hashing bit agrees with the input. Final error checking occurs using other more conventional error correction techniques, including CRC error coding. CRC error coding is employed so that intermittent lost or invalid bits due to noise or collision in the transmission channel that were reconstructed can be re-verified.

In a preferred embodiment, the most robust signal transmission techniques are applied to the tag ID number, so that even if other data transmitted by the tag are lost, computer 110 can recognize that a particular tag was trying to send data and another request for transmission by only that tag may be made from one of the readers when the RF activity quiets down. This includes the installation of the hashing bit algorithms as described above, except with greater frequency.

In practice, it is found that use of these techniques provides effective data transmission with as low as 7 dbm differentiation between colliding signals. Since an acknowledged signal is not retransmitted, the stronger tags in the near field (i.e., those closer to the reader) complete their transmissions quickly, leaving a quieter RF environment for more distant tags in the far field to respond. By eliminating the strongest signals early on, and randomizing the time slot selection for weaker signals, it is found that a large number of tags may be detected in a relatively short time period and with relatively small bandwidth requirements.

Each reader 101–103 operates both individually and in concert with the other readers 101–103 and computer 110. Each reader 101–103 is assigned a unique ID number by the applications software or as burned in at time of manufacture. The tag activation/wakeup signal consists of a short pulse with this reader ID number. In a preferred embodiment, such pulse will be on the order of 8 ms in duration, but the duration will depend on the number of bits required to uniquely specify the reader ID number and may be longer than 8 ms if a large number of readers, each with a unique ID number, are used. In one embodiment, transmission of the reader ID number is followed by tag-specific polling information. The tags, e.g., 151, as part of the transmission packet will also transmit back this reader ID number as confirmation that it is responding to a particular reader in case the signal is received by some other adjacent reader unit.

In the event an adjacent reader unit receives data intended for another reader, the data is in one embodiment retained, an acknowledgment issued to the tag and the other reader contacted to verify the tag information is received. The activating reader then acknowledges receipt of the tag data to the receiving reader and either rejects the data or maintains it for later disposition to the computer 110.

The protocol described herein provides a very effective mechanism for reducing RF traffic and allows far field tags to respond separately without being forced to wait for available far field time slots. In addition, repetitive attempts are significantly reduced, thus saving bandwidth.

Figure 6:
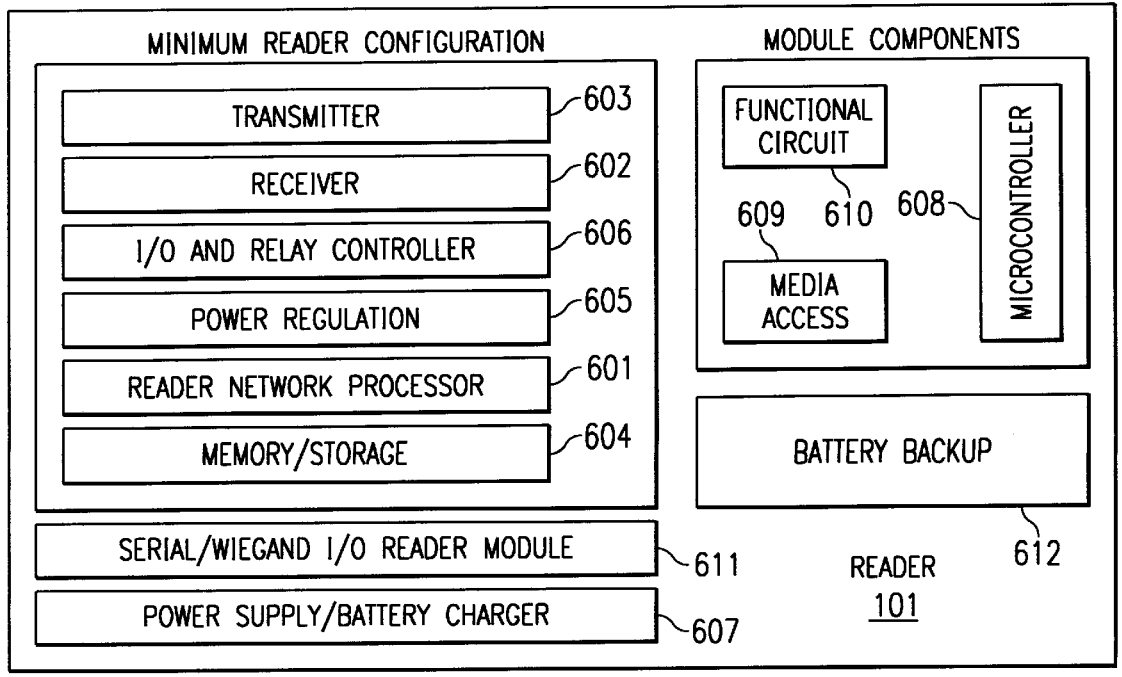
FIG. 6 is a diagram of the components of each reader 101–103 in accordance with the present invention.

Referring now to FIG. 6, in a preferred embodiment, each reader, e.g., 101, consists of a miniature network in and of itself essentially providing a means for parallel processing of different or even similar tasks. Reader to reader communications are performed using a specific processor that is directly connected to other readers via any type of conventional connection (e.g., RF, power line, twisted pair cabling, or other type of media) and routes pertinent information to the appropriate internal reader process, e.g., valid receipt of a far field tag from a poll request is routed to the reader receiver processor.

With specific reference now to the elements shown on FIG. 6, reader 101 includes a reader network processor 601, an RF receiver with processor 602, an RF transmitter with processor 603, a memory/data storage component with processor 604, a power supply and regulation circuitry 605, and an I/O & relay controller module with processor 606. Each component of the reader is configured to operate independently of the other, so each component or module can be subtracted or added in multiples and other such modules can be added to provide additional capabilities. As illustrated by the inset to FIG. 6, each module includes a microcontroller 608, a functional circuit 610 providing the specific function of the module, and a media access circuit 609 providing communication with the other components of reader 101.

In addition to providing full system flexibility, each module of each available reader can be shared with other readers, either to save cost or to provide fault tolerance to the network.

The computer 101 communicates with the reader network via a serial, wiegand reader communications module 611 or, in an alternate embodiment, another industry standard I/O port. The physical connection is directly from the computer 110 to the communications module 611 installed within an individual reader or in an alternative embodiment as a standalone module connected to the reader network. Power supply/battery module 607 and battery backup 612 provide alternate power sources in applications where such are deemed desirable.

From the above description, it will be apparent that the invention disclosed herein provides a novel and advantageous improved radio tag system. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A tag transceiver, comprising:
   a receiver module operable to listen for radio frequency activity;
   a processor module operable to detect radio frequency activity, to determine an amount of radio frequency activity during a period of time based on detected radio frequency activity during a plurality of sub-periods of the period, and to initiate transmission of a signal based on the amount of radio frequency activity; and
   a transmitter module operable to transmit the signal.

2. The tag transceiver of claim 1, wherein the processor module is operable to synchronize with a second tag transceiver and determine the amount of radio frequency activity during a fixed passive period of the second tag transceiver.

3. The tag transceiver of claim 2, wherein:
   the fixed passive period of the second tag transceiver follows a fixed number of transmissions from the second tag transceiver; and
   the processor module synchronizes with the second tag transceiver by detecting the fixed number of transmissions.

4. The tag transceiver of claim 1, wherein:
   the period of time is a plurality of cycles;
   the amount of radio frequency traffic relates to a number of the cycles during which the processor module detects radio frequency activity; and
   the processor module initiates transmission of the signal if the number of cycles during which the processor module detects radio frequency activity is below a threshold value.

5. The tag transceiver of claim 1, wherein the processor module initiates transmission of the signal by generating a plurality of time slots and determining a specific time for transmitting the signal according to a randomized time slot selection.

6. The tag transceiver of claim 1, wherein the processor module activates from a stand-by state in response to receiving an activation signal at the receiver module.

7. A method for transmitting data from a tag transceiver, the method comprising:
   listening for radio frequency activity;
   determining an amount of radio frequency activity during a period of time based on detected radio frequency activity during a plurality of sub-periods of the period; and
   initiating transmission of a response signal based on the amount of radio frequency activity.

8. The method of claim 7, further comprising:
   synchronizing the tag transceiver with a second tag transceiver; and
   determining the amount of radio frequency activity during a fixed passive period of the second tag transceiver.

9. The method of claim 8, wherein:
   the fixed passive period of the second tag transceiver follows a fixed number of transmissions from the second tag transceiver; and
   the tag transceiver synchronizes with the second tag transceiver by detecting the fixed number of transmissions.

10. The method of claim 7, wherein:
    the period of time is a plurality of cycles;
    the amount of radio frequency traffic relates to a number of the cycles during which the tag transceiver detects radio frequency activity; and
    the tag transceiver initiates transmission of the response signal if the number of cycles during which the tag transceiver detects radio frequency activity is below a threshold value.

11. The method of claim 7, wherein initiating transmission of the response signal comprises generating a plurality of time slots and determining a specific time for transmitting the signal according to a randomized time slot selection.

12. The method of claim 7, further comprising:
    receiving an activation signal from a reader transceiver; and
    changing from a stand-by state to an active state in response to receiving the activation signal.

13. A data transmission system, comprising:
    a reader transceiver operable to transmit a request signal; and
    a tag transceiver operable to receive the request signal and to transmit a response signal, wherein the tag transceiver listens for radio frequency activity, determines an amount of radio frequency activity during a period of time based on detected radio frequency activity during a plurality of sub-periods of the period, and initiates transmission of the response signal based on the amount of radio frequency activity.

14. The system of claim 13, wherein the tag transceiver is operable to synchronize with a second tag transceiver and to determine the amount of radio frequency activity during a fixed passive period of the second tag transceiver.

15. The system of claim 14, wherein:
    the fixed passive period of the second tag transceiver follows a fixed number of transmissions from the second tag transceiver; and
    the tag transceiver synchronizes with the second tag transceiver by detecting the fixed number of transmissions.

16. The system of claim 13, wherein:
    the period of time is a plurality of cycles;
    the amount of radio frequency traffic relates to a number of the cycles during which the tag transceiver detects radio frequency activity; and
    the tag transceiver initiates transmission of the signal if the number of cycles during which the tag transceiver detects radio frequency activity is below a threshold value.

17. The system of claim 13, wherein the tag transceiver initiates transmission of the response signal by generating a plurality of time slots and determining a specific time for transmitting the signal according to a randomized time slot selection.

18. The system of claim 13, wherein:
    the reader transceiver transmits an activation signal; and
    the tag transceiver changes from a stand-by state to an active state in response to receiving the activation signal.

19. The system of claim 13, wherein:

the reader transceiver transmits an acknowledgment signal in response to receiving the response signal from the tag transceiver; and the tag transceiver re-transmits the response signal if the tag transceiver does not receive the acknowledgment signal.

20. The system of claim 13, wherein:

the response signal includes a reader identification associated with the reader transceiver; and a second reader transceiver is operable to receive the response signal and communicate the response signal to the reader transceiver based on the reader identification.

21. The system of claim 13, wherein:

the request signal includes a tag identification associated with the tag transceiver;

the tag transceiver is operable to receive a portion of the request signal including the tag identification and to transmit an error signal indicating a failure to receive the complete request signal; and the reader transceiver is operable to receive the error signal and to re-transmit the request signal.

22. A method for transmitting data from a tag transceiver, comprising; listening for transmission activity at a radio frequency, the transmission activity including transmissions from other tag transceivers;

determining an amount of transmission activity at the radio frequency during a period of time;

generating a number of time slots based on the amount of transmission activity;

randomly selecting one of the time slots as a transmission time slot; and transmitting a signal during the transmission time slot.

23. The method of claim 22, wherein the number of time slots is proportional to the amount of transmission activity.

24. The method of claim 22, wherein the transmission time slot is randomly selected from the plurality of time slots.

25. The method of claim 22, further comprising immediately initiating transmission of the signal in response to detecting no transmission activity at the radio frequency during the period of time.

26. The method of claim 22, further comprising:

synchronizing the tag transceiver with a second tag transceiver; and determining the amount of transmission activity during a fixed passive transmission period of the second tag transceiver.

27. The method of claim 26, wherein:

the fixed passive transmission period of the second tag transceiver follows a fixed number of transmissions from the second tag transceiver; and a tag transceiver synchronizes with the second tag transceiver by detecting the fixed number of transmissions.

28. The method of claim 27, wherein the period of time is a plurality of transmission cycles of the second tag transceiver and each transmission cycle includes the fixed passive period.

* * * * *